United States Patent
Huang et al.

(10) Patent No.: US 8,665,946 B2
(45) Date of Patent: Mar. 4, 2014

(54) MACROBLOCK PAIR CODING FOR SYSTEMS THAT SUPPORT PROGRESSIVE AND INTERLACED DATA

(75) Inventors: Yu-Wen Huang, Taipei (TW); Chih-Hui Kuo, Hsinchu (TW); Ching-Yeh Chen, Taipei (TW)

(73) Assignee: MediaTek Inc., Science-Based Industrial Park, Hsin-Chu (TW)

( * ) Notice: Subject to any disclaimer, the term of this patent is extended or adjusted under 35 U.S.C. 154(b) by 1387 days.

(21) Appl. No.: 11/871,158

(22) Filed: Oct. 12, 2007

(65) Prior Publication Data
US 2009/0097566 A1   Apr. 16, 2009

(51) Int. Cl.
*H04N 7/12* (2006.01)

(52) U.S. Cl.
USPC ............. 375/240.02; 375/240.12; 375/240.01

(58) Field of Classification Search
USPC ............. 375/240.24, 240.02, 240.01, 240.12
See application file for complete search history.

(56) References Cited

U.S. PATENT DOCUMENTS

| | | | |
|---|---|---|---|
| 6,088,047 A | 7/2000 | Bose | |
| 7,961,786 B2* | 6/2011 | Holcomb | 375/240.12 |
| 2006/0008007 A1* | 1/2006 | Olivier et al. | 375/240.16 |
| 2006/0050976 A1 | 3/2006 | Molloy | |
| 2006/0088097 A1 | 4/2006 | Park | |
| 2006/0139491 A1* | 6/2006 | Baylon et al. | 348/558 |
| 2007/0030906 A1* | 2/2007 | Cote et al. | 375/240.16 |
| 2007/0121728 A1* | 5/2007 | Wang et al. | 375/240.18 |
| 2007/0230582 A1 | 10/2007 | Chiu | |
| 2008/0198934 A1* | 8/2008 | Hong et al. | 375/240.22 |
| 2008/0310515 A1* | 12/2008 | Matsuba et al. | 375/240.24 |
| 2009/0323811 A1* | 12/2009 | Francois et al. | 375/240.16 |

FOREIGN PATENT DOCUMENTS

TW   200625196   7/2006

OTHER PUBLICATIONS

IEEE Transactions on Circuits and Systems for Video Technology, vol. 12. No. 1. Jan. 2002. pp. 61-72.

* cited by examiner

*Primary Examiner* — Omer Mian
(74) *Attorney, Agent, or Firm* — Winston Hsu; Scott Margo

(57) ABSTRACT

A method of performing block matching on a video image of progressive data includes: receiving the video image; storing the video image to a first storage; loading a current macroblock pair and a current search window of the video image to a second storage and utilizing the current search window to perform block matching for the current macroblock pair; and loading a next macroblock pair and a plurality of macroblocks corresponding to a non-overlapped area of a next search window to the second storage to perform block matching for the next macroblock pair.

3 Claims, 4 Drawing Sheets

MACROBLOCK PAIR CODING FOR SYSTEMS THAT SUPPORT PROGRESSIVE AND INTERLACED DATA

BACKGROUND

This invention relates to macroblock coding, and more particularly relates to macroblock pair coding for both progressive and interlaced data.

Predictive coding is a technique widely used in video transmission to reduce the picture size after encoding. Typically, a frame is divided into a plurality of blocks known as macroblocks. When coding a current macroblock of a current frame, information from one or more reference frames is utilized to code the current macroblock in the current frame. A search over a certain area of the reference frame is performed to find the best matching block with the least prediction error. Therefore, for each current macroblock coding operation, information from reference frames will be re-utilized.

Conventional coding systems temporally store the video data to a dynamic storage such as a DRAM. When coding a current macroblock, the macroblock and the search window for coding the macroblock are uploaded from the DRAM to an SRAM. As the search windows for adjacent macroblocks will have some overlap area, only the non-overlapped area needs to be uploaded to the SRAM. Furthermore, there are two commonly used levels of data re-use: Level C and Level D. As these methods are well known in the art they will not be described here. For further background information please refer to "On the data reuse and memory bandwidth analysis for full-search block-matching VLSI architecture," *IEEE Transactions on Circuits and Systems for Video Technology*, vol. 12, no. 1, pp. 61-72, January 2002 by J. C. Tuan, T. S. Chang, and C. W. Jen. If Level C re-use is implemented, only a small SRAM is required. The DRAM bandwidth, however, is affected strongly. For Level D re-use, a large SRAM is required, but less DRAM bandwidth is utilized than for Level C.

For example, taking a macroblock as 16×16 pixels with two reference frames and search range equal to H±64 V±32, and assuming the video format is 1280×720×30 Hz, for a Level C data re-use, each time a macroblock is encoded, an area of 16×80 pixels per reference frame is loaded from the DRAM to the SRAM. The total size of a search window per reference frame is equal to 144×80 pixels. A total required size of the SRAM for Level C data re-use is 23,040 bytes. For Level D, however, a search window is far larger as it utilizes entire rows in the reference frame. Therefore a required size of the SRAM for Level D data re-use is 204,800 bytes. When SRAM expense is a consideration, Level C is clearly more desirable. When DRAM bandwidth is taken into consideration, however, Level D data re-use is much more efficient as it does not require constant heavy loading of data to the SRAM. In the case of real-time processing for 1280×720×30 Hz videos, the DRAM bandwidth for Level C data re-use is 276,480,000 bytes per second, whereas for Level D data re-use it is only 55,296,000 bytes per second.

There is therefore a trade-off between DRAM efficiency and SRAM expense. This may result in situations where both methods of data re-use cannot be applied.

SUMMARY

It is therefore an objective of the present invention to provide a method of macroblock coding that balances the trade-off between Level C and Level D data reuse methods.

A method of performing block matching on a video image of progressive data according to a first embodiment of the present invention is disclosed. The method comprises: receiving the progressive video image; storing the video image to a first storage; loading a current macroblock pair and a current search window of the video image to a second storage and utilizing the search window to perform block matching for the current macroblock pair; and loading a next macroblock pair and a plurality of macroblocks corresponding to a non-overlapped area of a next search window to the second storage to perform block matching for the next macroblock pair. The non-overlapped area of the next search window comprises macroblocks not within the current search window.

A method of performing block matching on a video image utilizing macroblock pairs as coding units that supports both interlaced and progressive data according to a second embodiment of the present invention is disclosed. The method comprises: receiving the video image; storing the video image to a first storage; checking a format of the video image; and when the format of the video image is progressive, selecting frame coding for processing macroblock pairs of the video image, uploading a current macroblock pair and a current search window of the video image to a second storage, and utilizing the search window to perform block matching for the current macroblock pair; and uploading a next macroblock pair and a plurality of macroblocks corresponding to a non-overlapped area of a next search window to the second storage to perform block matching for the next macroblock pair. The non-overlapped area of the next search window comprises macroblocks not within the current search window.

These and other objectives of the present invention will no doubt become obvious to those of ordinary skill in the art after reading the following detailed description of the preferred embodiment that is illustrated in the various figures and drawings.

DETAILED DESCRIPTION

Conventional coding systems utilize MBAFF (Macroblock Adaptive Frame-Field) coding when a video source is interlaced data. This is because some parts of a frame (relative stationary parts) are more suitable for frame coding whereas other parts of the frame (e.g. parts with faster movement) are more suitable for field coding. MBAFF coding utilizes macroblock pairs as a coding unit. The present invention proposes utilizing MBAFF coding for progressive data as well.

When a video source is received, the video format will be determined. If the video format is interlaced data, the coding method can proceed as in conventional MBAFF coding. The system can determine to encode one macroblock pair according to field coding, and encode another macroblock pair according to frame coding, depending on the image. If the video format is progressive data, the encoding system will still choose to perform MBAFF coding, but will skip the frame/field decision stage and perform all macroblock pair coding utilizing frame coding.

Figure 1:
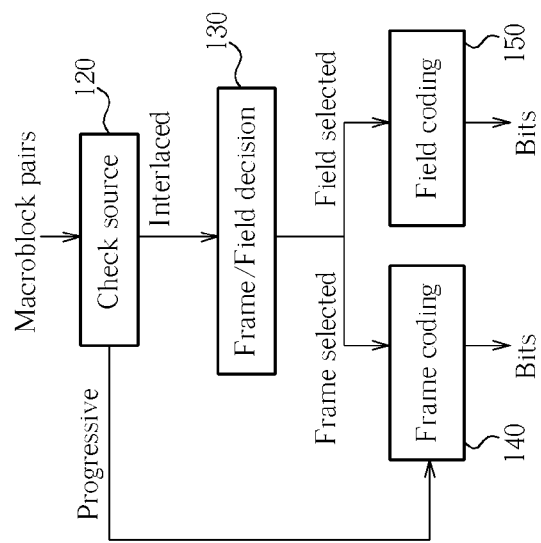
FIG. 1 is a flowchart of a method according to an embodiment of the present invention.

Please refer to FIG. 1, which shows the different flows for processing progressive and interlaced data. The steps are detailed as below:

Step 120: Receive macroblock pairs and check source. If interlaced go to Step 130, if progressive go directly to Step 140;

Step 130: For each macroblock pair, determine whether to encode the current macroblock pair according to frame coding or field coding. If frame coding go to Step 140, if field coding go to Step 150;

Step 140: Encode the current macroblock pair according to frame coding;

Step 150: Encode the current macroblock pair according to field coding.

Figure 2A:
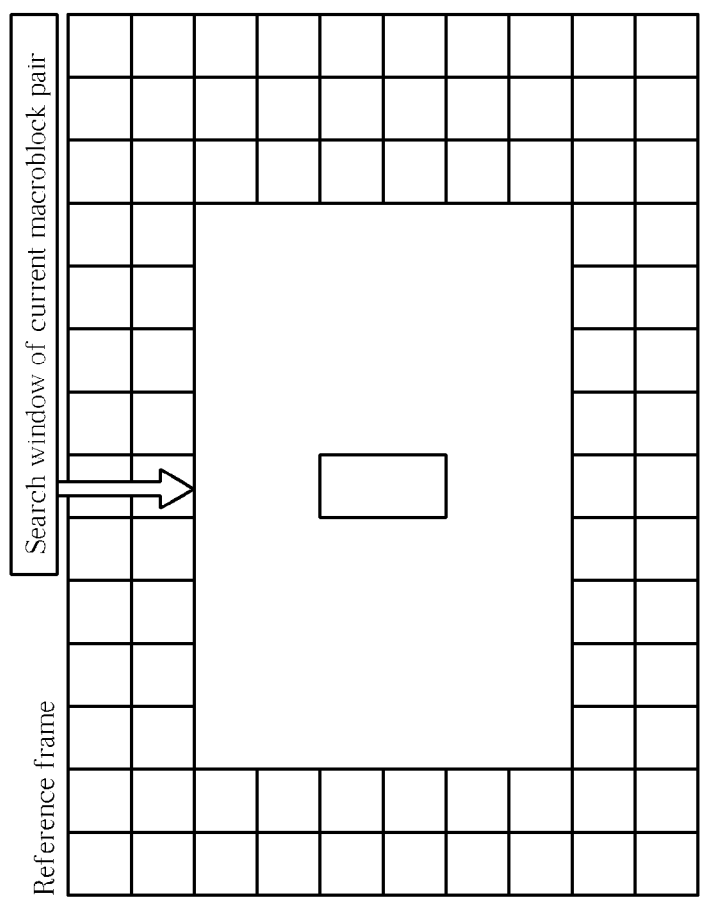
FIG. 2A is a diagram of a search window for coding a current macroblock pair.
Figure 2B:
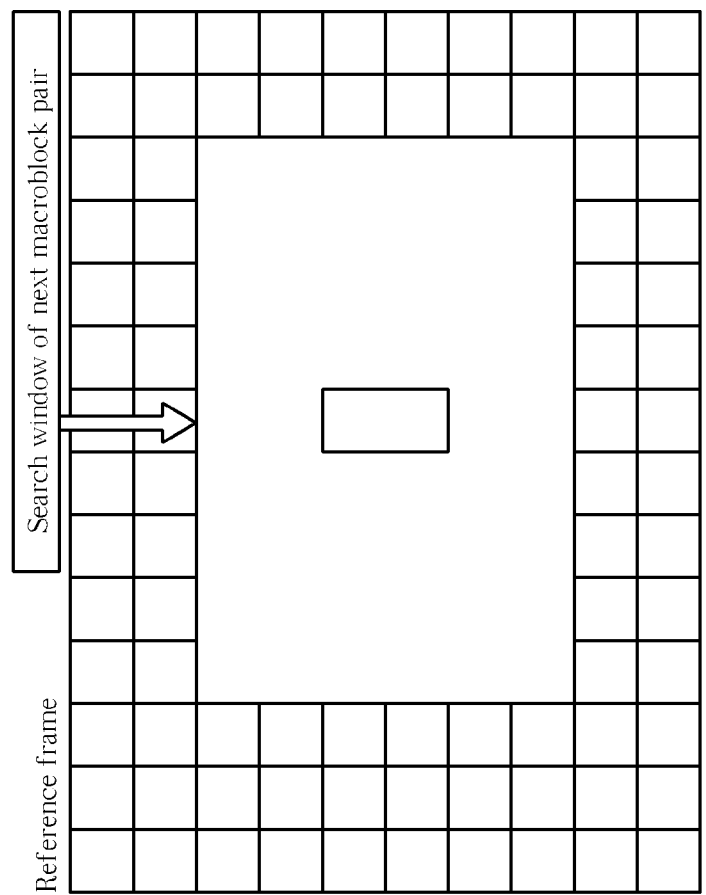
FIG. 2B is a diagram of a search window for coding a next macroblock pair.
Figure 2C:
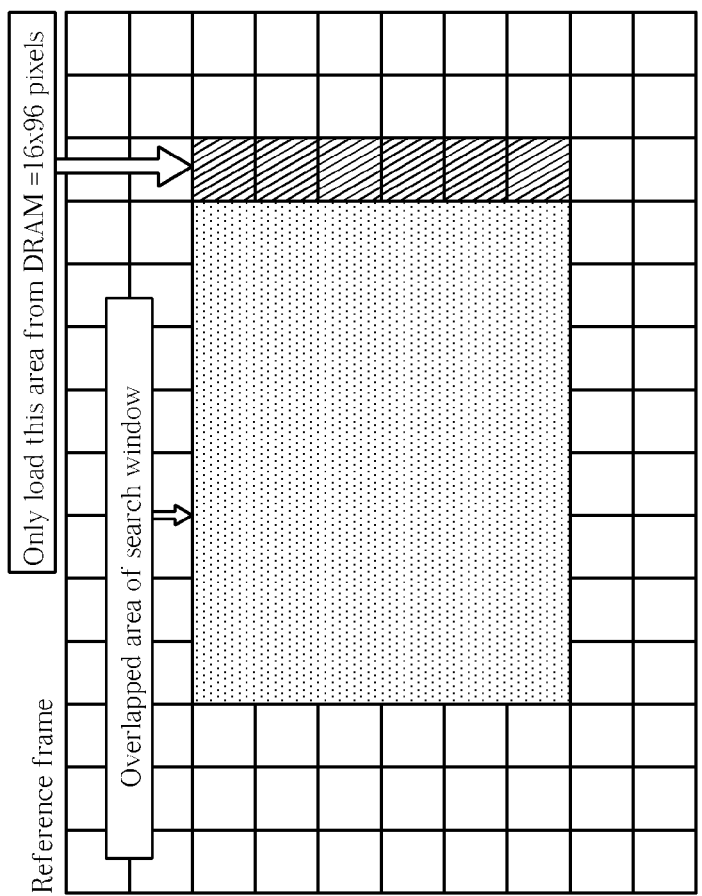
FIG. 2C is a diagram showing an overlapped area of the search windows for the current macroblock pair and the next macroblock pair.

Please refer to FIGS. 2A, 2B, and 2C, which are diagrams of a data re-use scheme incorporating 16×32-pixel macroblock pairs with a search range equal to H±64 V±32. FIG. 2A shows a search window for coding a current macroblock pair, FIG. 2B shows a search window for coding a next macroblock pair, and FIG. 2C shows an overlapped area of the two search windows. As can be seen from the diagrams, each time a next macroblock pair is coded, the area that needs to be loaded to the SRAM is 16×96 pixels. This is the area corresponding to a non-overlapped area of the search windows. For frame coding, a macroblock pair corresponds to a top macroblock and a bottom macroblock from continuous rows of a frame.

As detailed above, for Level C data re-use, a search window of 144×80 pixels is required. For macroblock pair coding, an extra row of macroblocks is loaded to the SRAM, therefore a total required size of the SRAM is 27,648 bytes (144×96×2 pixels, where 2 is the number of reference frames), which compares favorably with the Level C usage. For the DRAM, as a macroblock pair is utilized as the coding unit, the bandwidth of the DRAM is only about half that of Level C data re-use. In the case of real-time processing of 1280×720×30 Hz videos, the total bandwidth of the DRAM for macroblock pair coding is 165,888,000 bytes per second. Although this is still higher than for Level D data re-use, it saves significantly on Level C, thereby providing a middle ground enabling SRAM and DRAM considerations to both be met.

The method of the present invention can be utilized in systems that support both progressive and interlaced data, or utilized in systems that only support progressive data. Because the frame/field coding decision does not need to be taken when the system detects the data source is progressive, the coding process is simpler than in conventional systems. This method can be utilized in systems that support MBAFF coding such as H.264 and future standards.

As the method of the present invention provides a middle ground of data storage between Level C and Level D data re-use, it improves over the conventional art by providing a balance between DRAM bandwidth and size of the SRAM.

Those skilled in the art will readily observe that numerous modifications and alterations of the device and method may be made while retaining the teachings of the invention.

What is claimed is:

1. An adaptive coding method for a video image utilizing macroblock pairs as coding units that supports interlaced and progressive data, comprising:
   receiving the video image;
   storing the video image to a first storage;
   determining a format of the video image as progressive or interlaced;
   if the format of the video image is determined to be progressive, disabling an adaptive decision process of the adaptive coding method so that frame coding is selected for processing a plurality of macroblock pairs of the video image, uploading a current macroblock pair and a current search window of the video image to a second storage different than the first storage, and utilizing the current search window to perform block matching for the current macroblock pair;
   uploading a next macroblock pair and a plurality of macroblocks corresponding to a non-overlapped area of a next search window to the second storage to perform block matching for the next macroblock pair;
   wherein the non-overlapped area of a next search window comprises macroblocks not within the current search window; and
   if the format of the video image is determined to be interlaced, enabling the adaptive decision process;
   wherein the adaptive decision process selects frame coding to encode a first set of macroblock pairs of the video image and field coding to encode a second set of macroblock pairs of the video image.

2. The method of claim 1 wherein the video image is encoded in H.264.

3. The method of claim 1 wherein the video image is encoded in a video standard that supports Macroblock Adaptive Frame-Field (MBAFF) coding.

* * * * *